(12) United States Patent
Lang

(10) Patent No.: US 7,819,219 B2
(45) Date of Patent: Oct. 26, 2010

(54) LOCKABLE COVER FOR ELECTRONIC CONTROL UNIT

(75) Inventor: Chris Lang, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 196 days.

(21) Appl. No.: 11/960,811

(22) Filed: Dec. 20, 2007

(65) Prior Publication Data

US 2008/0173494 A1   Jul. 24, 2008

Related U.S. Application Data

(60) Provisional application No. 60/878,315, filed on Dec. 31, 2006, provisional application No. 60/975,273, filed on Sep. 26, 2007.

(51) Int. Cl.
*B60R 25/00* (2006.01)

(52) U.S. Cl. .................................................. 180/289

(58) Field of Classification Search ............... 180/289, 180/287, 271
See application file for complete search history.

(56) References Cited

U.S. PATENT DOCUMENTS

| | | | |
|---|---|---|---|
| 5,990,574 A | * | 11/1999 | Lecznar et al. ............ 307/10.5 |
| 6,130,604 A | | 10/2000 | Matsumoto et al. |
| 6,161,640 A | | 12/2000 | Yamaguchi |
| 6,433,675 B1 | | 8/2002 | Suda et al. |
| 6,503,098 B2 | | 1/2003 | Aoki et al. |
| 6,573,615 B1 | | 6/2003 | Asakura et al. |
| 6,794,765 B2 | | 9/2004 | Izumiura et al. |
| 6,998,958 B2 | | 2/2006 | Asakura et al. |
| 6,999,867 B2 | | 2/2006 | Konno |
| 7,145,264 B2 | | 12/2006 | Nagae et al. |
| 2002/0175566 A1 | | 11/2002 | Allen et al. |

OTHER PUBLICATIONS http://www.drivewire.com—FI-ECU from an Audi 100 5 CYL Ignition Control Unit, Worldpac 1998-2002.
http://www.drivewire.com—FI-ECU from a BMW 318i electronic control unit for engine control, Worldpac 2003.
http://www.drivewire.com —FI-ECU from a BMW 318i electronic control unit for CU 113X L-Jetronic, Worldpac 2002.

* cited by examiner

*Primary Examiner*—Faye M. Fleming
(74) *Attorney, Agent, or Firm*—Mark E. Duell, Esq.; Emerson Thomson Bennett

(57) ABSTRACT

An electronic control unit (ECU) may include a central processing unit (CPU); an interface that can engage with at least one vehicle component; and, a lockable ECU cover that covers at least a portion of the ECU and that limits access to the ECU.

16 Claims, 4 Drawing Sheets

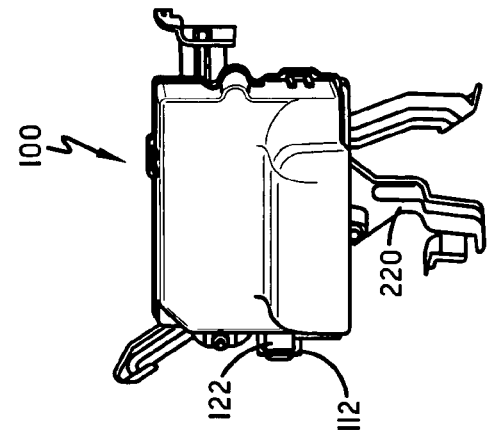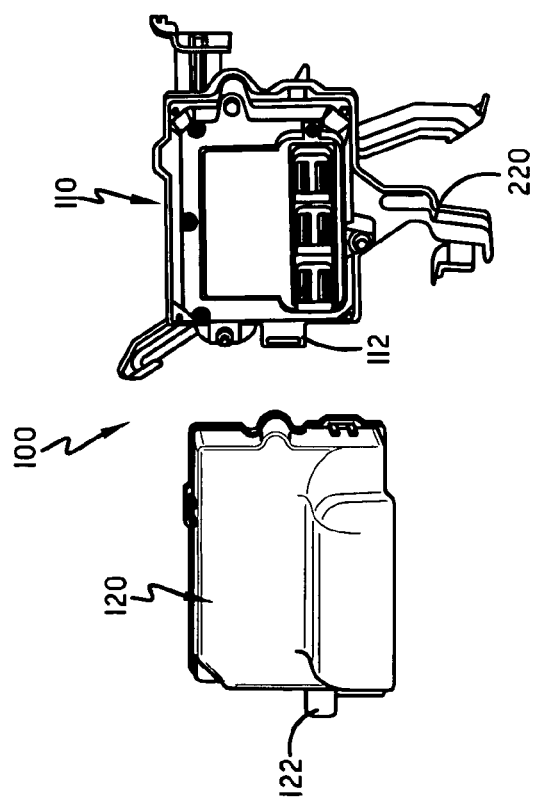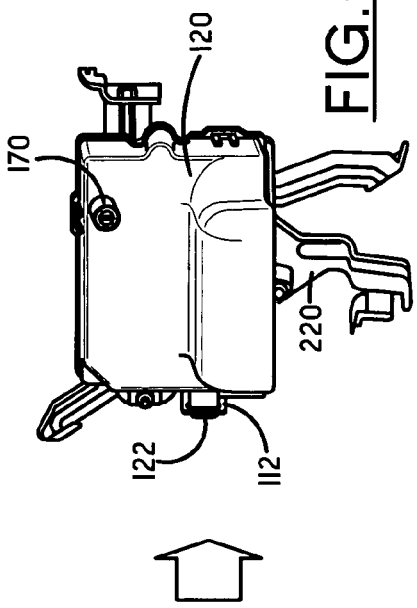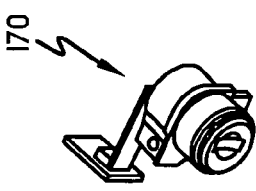

LOCKABLE COVER FOR ELECTRONIC CONTROL UNIT

This application claims priority to U.S. Ser. No. 60/878,315, entitled LOCKABLE COVER FOR ELECTRONIC CONTROL UNIT, filed Dec. 31, 2006, and U.S. Ser. No. 60/975,273, entitled LOCKABLE COVER FOR ELECTRONIC CONTROL UNIT, filed Sep. 26, 2007, both which are incorporated herein by reference.

I. BACKGROUND OF THE INVENTION

A. Field of Invention

This invention pertains to the art of methods and apparatuses for vehicle electronic control units, and more specifically to methods and apparatuses for limiting access to a vehicle electronic control unit to reduce vehicle thefts.

B. Description of the Related Art

It is known in the automotive industry to provide vehicles with an electronic control unit (ECU). An ECU is a control device usually having a central processing unit (CPU) (such as a microprocessor), random access memory (RAM), read only memory (ROM), and an input/output interface. A vehicle may have one or more ECUs to control one or more vehicle components. ECUs range in complexity from an Engine Control Unit which handles the logic for managing the power-train system efficiency, to a simple body module that controls the automatic door locks or power windows.

It is also known in the automotive industry to provide a vehicle with a theft-deterrent system. Some theft-deterrent systems work with an ECU. In one example, the ECU controls some engine starting component (such as the fuel injection system or the ignition system). Only the specific owner's key will enable the vehicle to start because the key communicates a specific signal recognized by the ECU and the theft-deterrent system. Without the proper key, such systems make it impossible for a thief to "hot wire" the vehicle.

While such theft-deterrent systems work well for their intended purpose, they have a disadvantage related to the fact that it has become relatively easy to obtain a matching ECU and theft-deterrent system from the original equipment manufacturer (OEM). Thieves are thus able to break into a vehicle and replace the original ECU/theft-deterrent system with their own matching pair. Since they also acquire the correct key for their system, they can steal the car in a relatively short time. What is needed is a way to better protect an ECU.

II. SUMMARY OF THE INVENTION

According to one embodiment of this invention, an ECU assembly includes a microprocessor; an interface that can engage with at least one vehicle component; and, a lockable ECU cover that covers at least a portion of the ECU and that limits access to tie ECU.

According to another embodiment of this invention, the ECU assembly includes a key that can unlock the ECU cover and that can be used to access the vehicle.

According to another embodiment of this invention, the ECU assembly includes a key that can unlock the ECU cover and that can be used to start a locomotion device, such as an electric motor or internal combustion engine, on the vehicle.

According to another embodiment of this invention, the ECU is used to control fuel injection into an internal combustion engine.

According to yet another embodiment of this invention, the ECU is used to control ignition of an internal combustion engine.

According to another embodiment of this invention, a method includes the steps of: providing a vehicle with an ECU; and, limiting access to the ECU with a lockable ECU cover that covers at least a portion of the ECU.

According to another embodiment of this invention, the method includes the step of: accessing the ECU by unlocking the ECU cover with a key that can also be used to access the vehicle.

According to another embodiment of this invention, the method includes the steps of: providing the vehicle with a locomotion device; and, accessing the ECU by unlocking the ECU cover with a key that can also be used to start the locomotion device.

One advantage of this invention is that a vehicle cannot be stolen simply by replacing the original ECU/theft-deterrent system with a new one.

Another advantage of this invention is that a thief is unable to gain access to an ECU without the original owner's key.

Another advantage of this invention is that the ECU is easily accessible to a service technician that possesses the owner's key.

Still another advantage of this invention is that any ECU can be protected for any reason.

Still other benefits and advantages of this invention will become apparent to those skilled in the art to which it pertains upon a reading and understanding of the following detailed specification.

III. BRIEF DESCRIPTION OF THE DRAWINGS

The invention may take physical form in certain parts and arrangement of parts, embodiments of which will be described in detail in this specification and illustrated in the accompanying drawings which form a part hereof and wherein:

FIG. 2 illustrates an ECU and a cover shown unassembled according to one embodiment of this invention.

FIG. 3 illustrates the cover of FIG. 1 placed over the ECU of FIG. 1 with the cover shown as being transparent for clarity.

FIG. 4 illustrates a key cylinder that may be used in another embodiment.

FIG. 5 illustrates the key cylinder of FIG. 4 used as a lock to lock the cover onto the ECU with the cover shown as being transparent for clarity.

IV. DETAILED DESCRIPTION OF THE INVENTION

Figure 1:
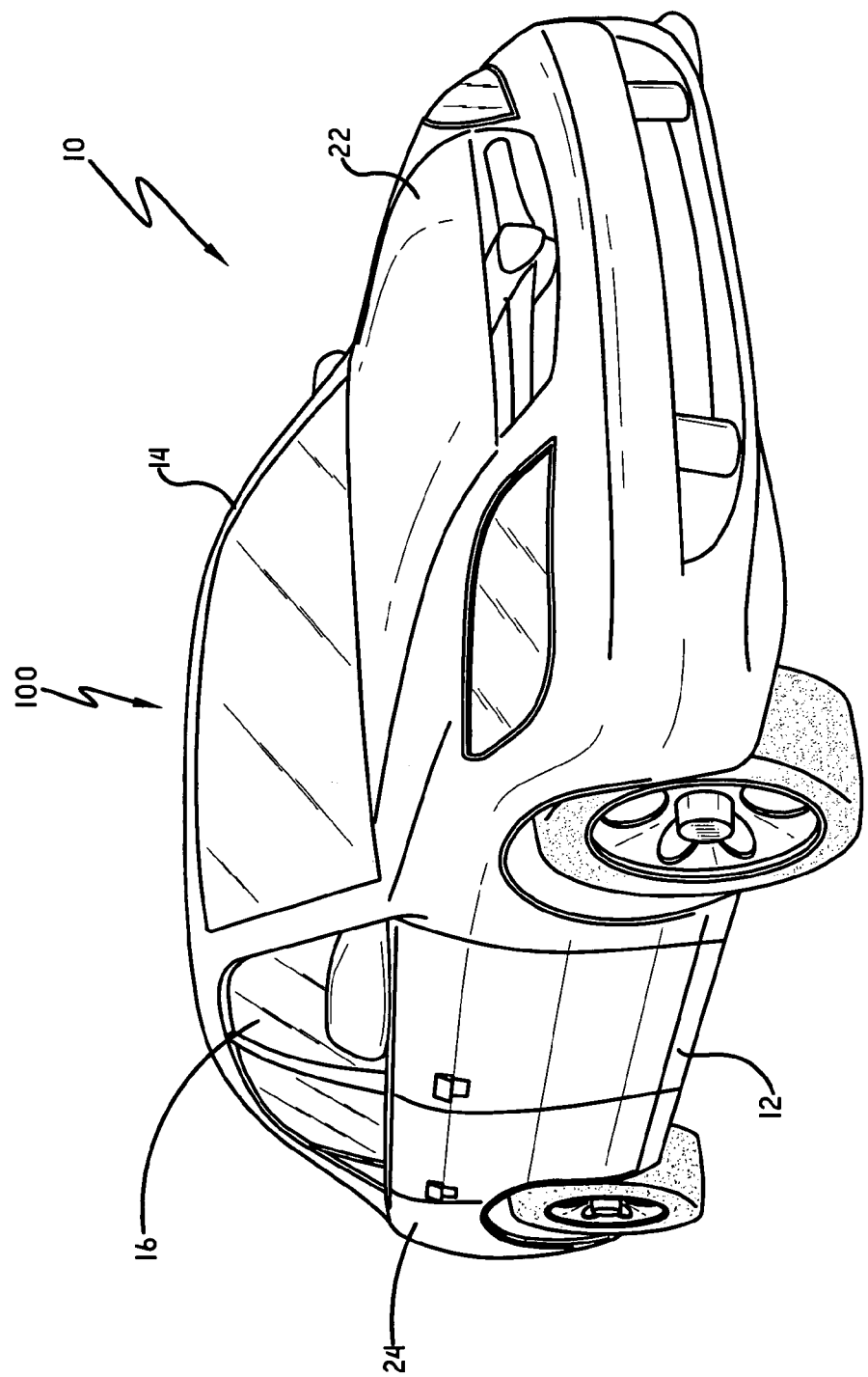
FIG. 1 is a perspective front view of a vehicle equipped with an electronic control unit (ECU) assembly according to this invention.
Figure 6:
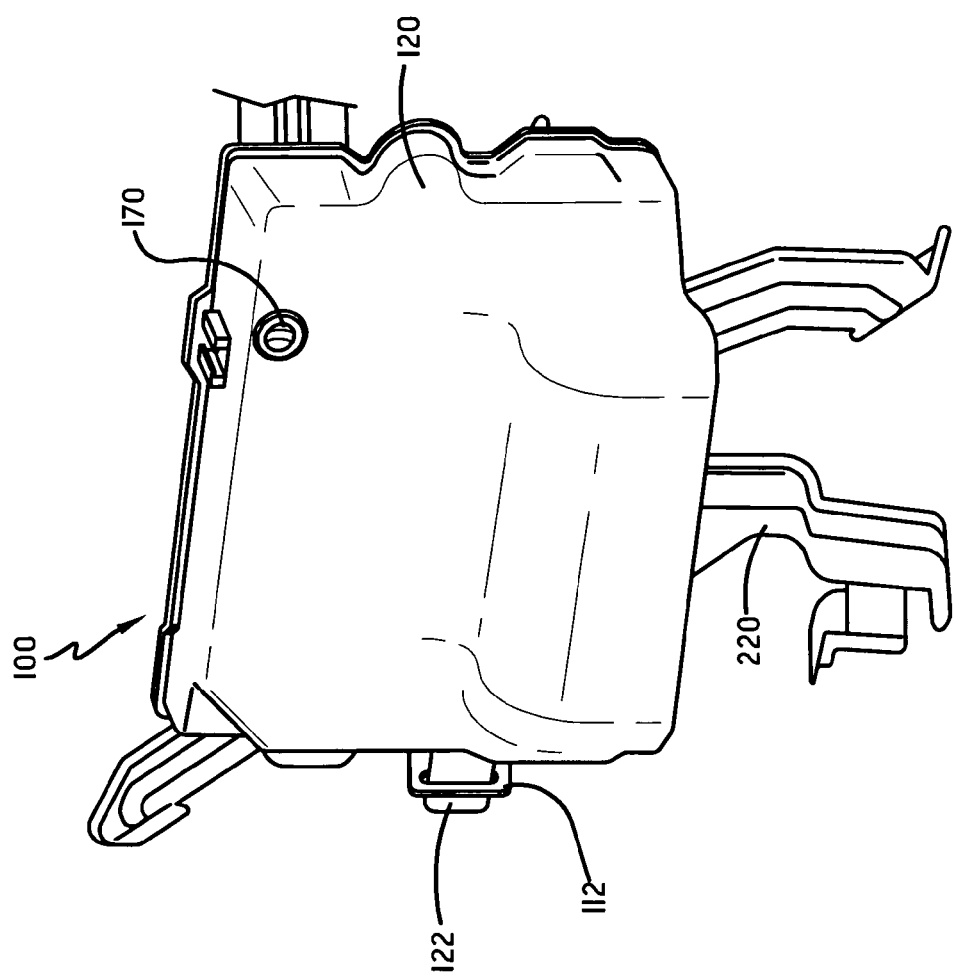
FIG. 6 is a view similar to FIG. 5 except that the cover is shown in its typical non-transparent form.

Referring now to the drawings wherein the showings are for purposes of illustrating embodiments of the invention only and not for purposes of limiting the same, FIG. 1 shows a vehicle 10 equipped with an electronic control unit (ECU) assembly 100 according to this invention. It should be noted that while an automotive passenger vehicle 10 is shown, the inventive ECU assembly 100 will work well with other vehicles including all types of trucks, motorcycles, all terrain vehicles (ATVs), sport utility vehicles (SUVs), vans, etc. and for other purposes as well. The vehicle 10 may include a vehicle frame 12 and a body 14 that is supported on the frame 12. The body 14 may define a passenger compartment 16, which is equipped with one or more seats to receive one or more passengers as is well known in the art. The body 14 may also define a locomotion compartment 22 and a storage compartment (or trunk) 24. The locomotion compartment 22 contains at least one locomotion device to provide the power to move the vehicle 10 from place to place. The particular locomotion device can be any chosen with sound engineering judgment. In one embodiment, the locomotion device is an electric motor. In another embodiment, the locomotion device is an internal combustion engine. In yet another embodiment, the locomotion device is both an electric motor and an internal combustion engine. Such a vehicle is often referred to as a hybrid. The vehicle 10 also may include all the conventional components of a vehicle 10 that are well known in the art.

With reference now to FIGS. 1-3, the ECU assembly 100 includes an ECU 110 and a cover 120. The particular ECU 110 can be any used to control a vehicle component. Some non-limiting examples of vehicle components/systems that may be controlled by one or more ECUs are: power-train systems; anti-lock braking (ABS) systems; air bag systems; fuel injection systems; ignition systems; automatic door locks; and, power windows. It should be understood that the cover 120 can be used to limit access to an ECU 110 for any reason. The cover 120 can be attached to the ECU 110 in any manner chosen with sound engineering judgment. For the embodiment shown, the cover 120 has an extension 122 that is received within an opening 112 formed in a portion of the ECU 110 or formed in a component to which the ECU 110 is attached. By placing the extension 122 within the opening 112, the cover 120 is held in place with respect to the ECU 110. The ECU assembly 100 may have any number of additional components depending on the particular type and/or use for the ECU assembly 100 as is known by those of skill in the art.

With continuing reference to FIGS. 1-3, The ECU 110 may be located anywhere on or in the vehicle 10. Some non-limiting examples for locating the ECU 110 include within the passenger compartment 16, such as under a seat, within the locomotion compartment 22 and within the storage compartment 24. The ECU 110 maybe connected to the vehicle component(s) in any manner chosen with sound engineering judgment. U.S. Pat. No. 6,503,098 titled WIRE HARNESS STRUCTURE, having a common assignee and incorporated herein by reference, provides some embodiments of how ECUs may be connected to vehicle components and to each other. For the embodiment shown, the ECU 110 is attached to a bracket 220 that may then be attached to the vehicle component. In one embodiment, the cover 120 limits access to the ECU 110 in order to male it more difficult for a thief to steal the vehicle 10.

With reference now to FIGS. 1 and 4-6, in another embodiment the ECU assembly 100 may include a lock 170 so that the cover 120 may be locked to the ECU 110. While the lock 170 used for this invention can be of any type chosen with sound engineering judgment, in one embodiment the lock 170 can only be opened with an appropriate key. In one embodiment, the appropriate key is the vehicle owner's key. In a specific embodiment, shown, the lock includes a key cylinder similar to those used with a vehicle glovebox. The cover will not restrict service access to the ECU because the technician would be able to use the vehicle owner's key.

Figure 7:
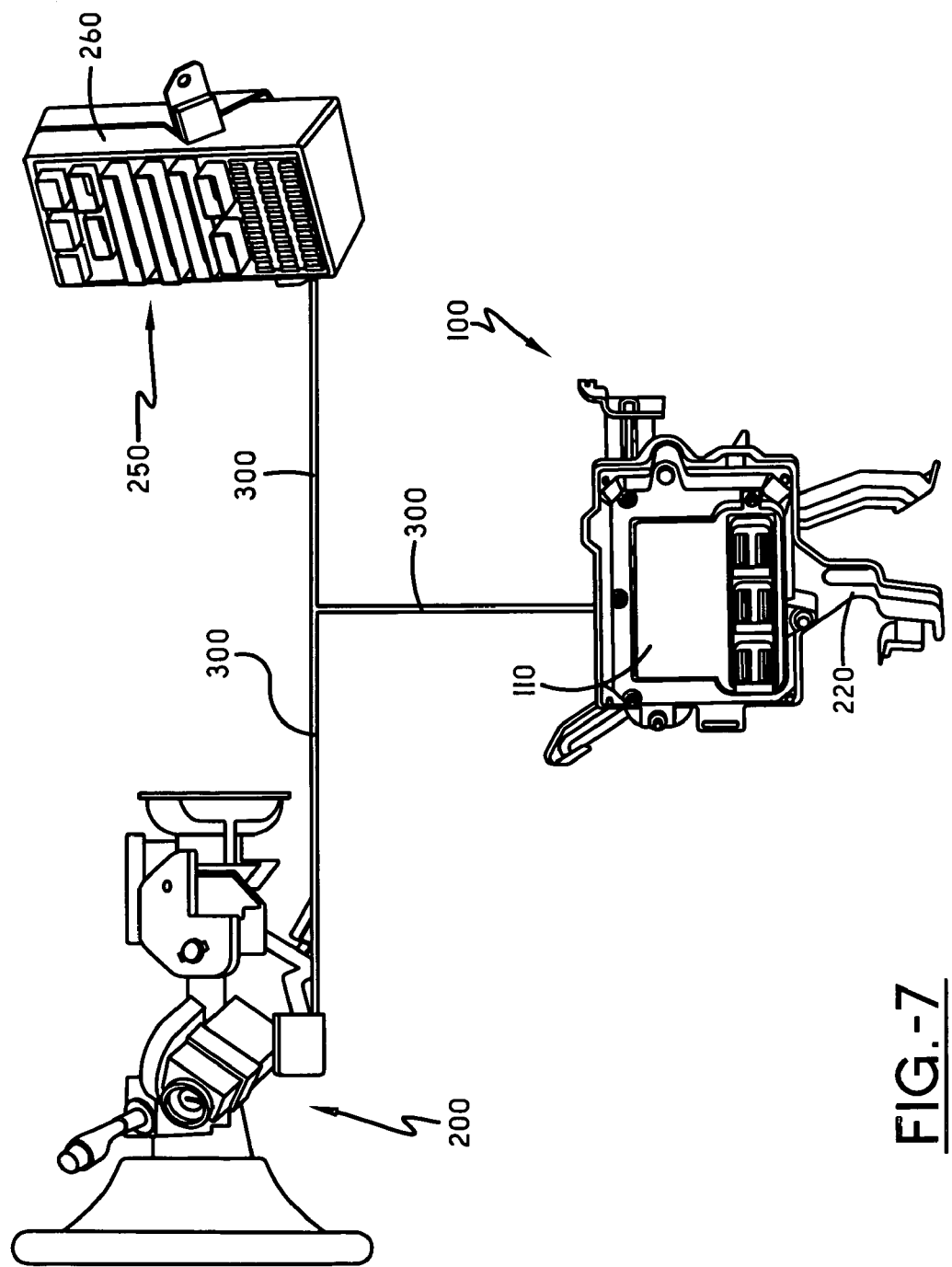
FIG. 7 is a schematic showing how, in another embodiment of this invention, a theft-deterrent system may be used.

With reference now to FIGS. 1 and 7, in another embodiment the ECU assembly 100 may be combined with a theft-deterrent system 200 such as with wiring 300. The ECU 110 may thus be used to control some engine starting component (such as the fuel injection system or the ignition system). An ECU 110 used to control fuel injection is sometimes called an FI-ECU (Fuel Injection Electronic Control Unit). The FI-ECU may be connected to the vehicle component(s) in any manner chosen with sound engineering judgment. U.S. Pat. No. 6,573,615 titled ELECTRONIC KEY SYSTEM FOR A VEHICLE, U.S. Pat. No. 6,794,765 titled ENGINE STARTING CONTROL SYSTEM AND METHOD THEREFOR, and U.S. Pat. No. 6,998,958 titled REMOTE CONTROL SYSTEM FOR A VEHICLE, each having a common assignee and each incorporated herein by reference, provide some embodiments of how the FI-ECU may be connected to vehicle components and to other ECUs.

With continuing reference to FIGS. 1 and 7, when the appropriate owner's key is inserted into ignition switch, the theft-deterrent system 200 reads the key code and transfers the code to the appropriate ECU 110, such as the FI-ECU. If the code matches the ECU and the theft-deterrent system, then the ECU will turn on and start the car. In an alternate embodiment, also shown in FIG. 7, another component, a security device 250, is added to the system in any manner such as with wiring 300. The optional security device may be located in the vehicle fuse box 260. In one specific embodiment, the security device is known as an immobilizer entry system (IMOES). The security device may be unique to the particular ECU and may be required to start the vehicle. To bypass this system, all units, the theft-deterrent system, the ECU and the security device would have to be replaced with a matching key and unit set in order to steal the vehicle.

Various embodiments have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

Having thus described the invention, it is now claimed:

I claim:

1. A vehicle comprising:
   a frame;
   a locomotion device;
   an ECU assembly supported to the frame and comprising:
      (a) a CPU;
      (b) an interface that engages with at least one locomotion related component; and,
      (c) a lockable ECU cover that covers at least a portion of the ECU and that limits physical access to the ECU;
   a key that can unlock the ECU cover and that can be used in an ignition switch to start the locomotion device; and,
   a theft-deterrent system that is operatively connected to the ECU assembly and that prevents the locomotion device from starting unless the key is a pre-determined key.

2. The vehicle of claim 1 wherein:
   the locomotion device comprises an internal combustion engine; and,
   the ECU comprises an ignition ECU.

3. The vehicle of claim 1 wherein:
   the locomotion device comprises an internal combustion engine; and,
   the ECU comprises a fuel injection ECU.

4. The vehicle of claim 3 further comprising:
   a fuse box; and, a security device positioned in the fuse box that is operatively connected to the ECU assembly and the theft-deterrent system.

5. The vehicle of claim 1 wherein the lockable ECU cover comprises:

a key cylinder.

6. A method comprising the steps of:

providing a vehicle with an ECU;

limiting physical access to the ECU with a lockable ECU cover, supported by the vehicle, that covers at least a portion of the ECU; and, accessing the ECU by unlocking the ECU cover with a key that can also be used to access the vehicle.

7. The method of claim 6 wherein the step of, accessing the ECU by unlocking the ECU cover with a key that can also be used to access the vehicle, comprises the step of:

unlocking the ECU cover only with a key that can also be used to access the vehicle.

8. A method comprising the steps of:

providing a vehicle with an ECU and a locomotion device;

limiting physical access to the ECU with a lockable ECU cover, supported by the vehicle, that covers at least a portion of the ECU;

accessing the ECU by unlocking the ECU cover with a key that can also be used to start the locomotion device; and, providing a theft-deterrent system that prevents the locomotion device from starting unless the key is a pre-determined key.

9. A method comprising the steps of:

providing a vehicle with an ECU and a locomotion device;

limiting physical access to the ECU with a lockable ECU cover, supported by the vehicle, that covers at least a portion of the ECU; and, accessing the ECU by unlocking the ECU cover only with a key that can also be used to start the locomotion device.

10. A method comprising the steps of:

providing a vehicle with an ECU and with a locomotion device that comprises an internal combustion engine;

limiting physical access to the ECU with a lockable ECU cover, supported by the vehicle, that covers at least a portion of the ECU and, providing the ECU to comprise a fuel injection ECU.

11. An ECU assembly comprising:

a CPU;

an interface that can engage with at least one associated vehicle component;

a lockable ECU cover that covers at least a portion of the ECU and that limits physical access to the ECU; and, a key that can unlock the ECU cover and that can be used to access the associated vehicle.

12. An ECU assembly comprising:

a CPU;

an interface that can engage with at least one associated vehicle component;

a lockable ECU cover that covers at least a portion of the ECU acid that limits physical access to the ECU; and, a key that can unlock the ECU cover and that can be used to start a locomotion device on the associated vehicle.

13. The ECU assembly of claim 12 wherein:

the locomotion device comprises an internal combustion engine; and, the ECU comprises a fuel injection ECU.

14. The ECU assembly of claim 12 further comprising:

a theft-deterrent system that prevents the locomotion device from starting unless the key is a pre-determined key.

15. The ECU assembly of claim 12 wherein:

the locomotion device comprises an internal combustion engine; and, the ECU comprises an ignition ECU.

16. An ECU assembly comprising:

a CPU;

an interface that can engage with at least one associated vehicle component;

a lockable ECU cover that covers at least a portion of the ECU and that limits physical access to the ECU; and, wherein the lockable ECU cover comprises a key cylinder.

* * * * *